Jan. 11, 1938. C. F. TEARS Re. 20,623
HIGH MELTING POINT WAX AND PRODUCTION OF SAME
Original Filed Nov. 16, 1933
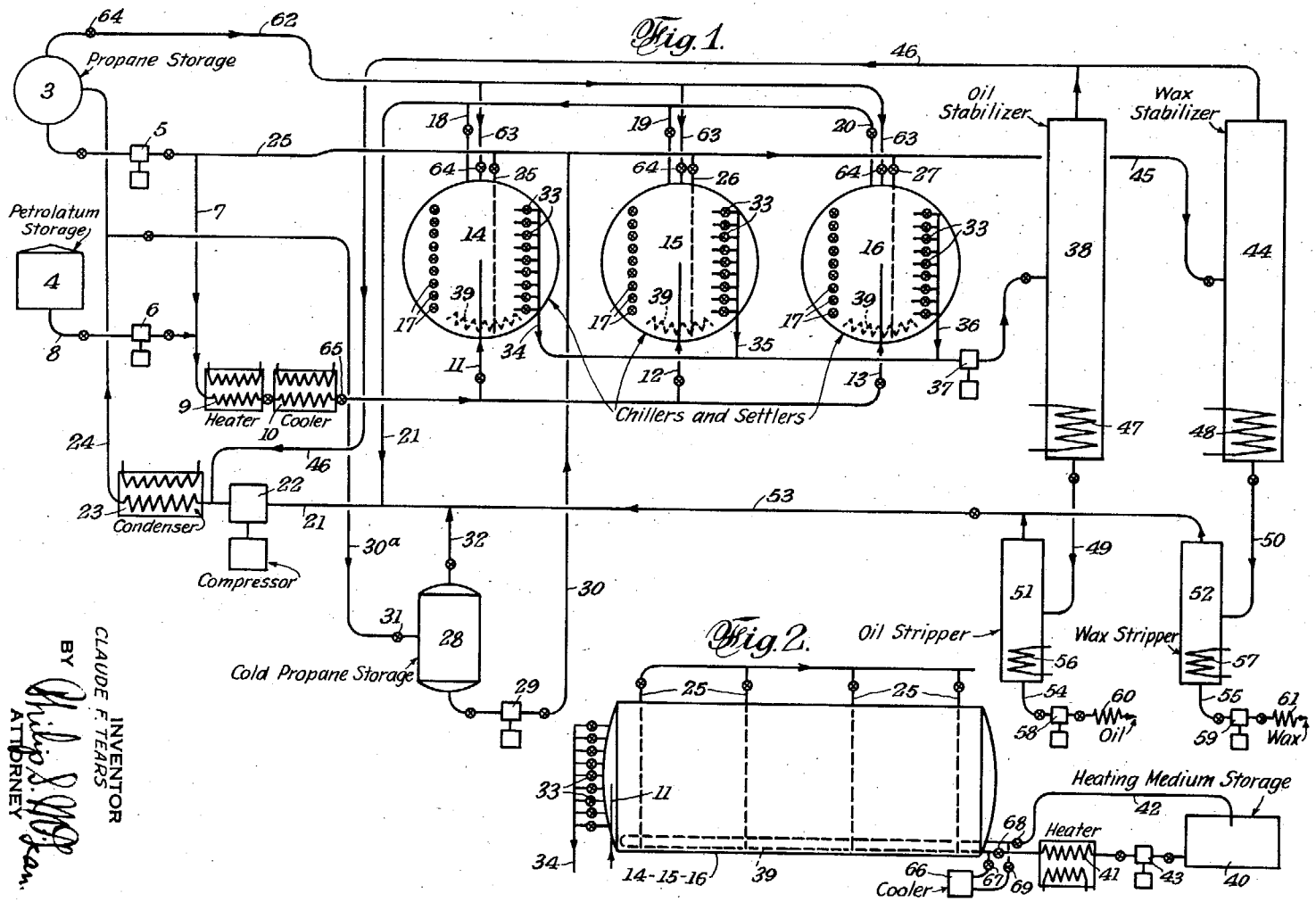
INVENTOR
CLAUDE F. TEARS
BY Philip S. McKan
ATTORNEY Reissued Jan. 11, 1938

Re. 20,623

UNITED STATES PATENT OFFICE 20,623

HIGH MELTING POINT WAX AND PRODUCTION OF SAME

Claude F. Tears, Warren, Pa., assignor to The Petroleum Processes Corporation, Wichita, Kans., a corporation of Kansas Original No. 2,000,427, dated May 7, 1935, Serial No. 698,283, November 16, 1933. Application for reissue May 6, 1937, Serial No. 141,034

5 Claims. (Cl. 196—20)

This invention relates to high melting point wax and production of the same.

Special objects of the invention are to provide a high quality wax of this nature, at low cost, with relatively simple equipment and by commercially practical, economical methods.

A special feature of the invention and by which the foregoing and other desirable objects are in part attained, is the utilization of petrolatum stock as the source of the desired product.

Petrolatum produced in normal refining operations by cold settling or centrifuging of residual steam refined stock or cylinder stock distillates is known to contain about from 25% to 75% of high melting point wax and 75% to 25% of bright stock. This is a filtered or partially decolorized product originating as it has from filtered cylinder stock or the like. The contained wax and oil are therefore partially or fully decolorized. Because of the amorphous nature and intimate association of the wax with the oil, it has been impossible to separate these economically by existing methods and so it has not been possible to utilize this wax. Petrolatum stock heretofore therefore has largely had only a fuel oil value.

By the present invention, the petrolatum wax is de-oiled to form a high grade, high melting point wax and in so doing decolorized bright stock of high lubricating value is obtained.

In the accompanying drawing, there is illustrated a typical form of apparatus for effecting the objects of the invention. It is to be understood however, that such illustration is mainly by way of disclosure and that changes and modifications may be resorted to, all within the true intent and broad scope of the invention.

Fig. 1 is a diagrammatic picturization of apparatus suitable for carrying out the invention.

Fig. 2 is a similar diagrammatic representation of one of the chilling and settling chambers, viewed in side elevation, particularly to show the heating system for liquefying and removing the precipitated wax.

Briefly, the invention involves dissolving the petrolatum in a normally gaseous liquid hydrocarbon or similar solvent, in proportions as hereinafter described, chilling the mixture by evaporation of the solvent or by indirect chilling methods, precipitating the wax by cold settling under pressure, drawing off the oil-solvent solution, heating and drawing off the wax-solvent mixture and separately stripping the solvent from the withdrawn wax and oil. If chilling is accomplished by evaporating a portion of the solvent, the solvent evaporated is replaced by additional solvent to a volume approximately equal to or in excess of the original volume of the mixture to maintain the desired solvent to petrolatum ratio.

This process in the illustration is effected as follows:

Normally gaseous liquid solvent such as propane, stored in tank 3, is mixed with petrolatum stock from tank 4, by being transferred by pumps 5 and 6, through lines 7 and 8 to a heater 9. This may be a steam coil heater which will raise the temperature of the mixture to 125° F. to 200° F., sufficient back pressure being maintained to hold the solvent in the liquid state by means such as back pressure valve 65.

The hot mixture is next cooled as by passage through a water cooler 10, and charged through lines 11, 12, 13, into the chillers and settlers 14, 15, 16, in parallel. These vessels are shown equipped with try-cocks 17, and in this charging operation, they may be filled to the top try-cock level under a pressure of approximately 150 lbs. per square inch, pressure sufficient to hold the propane in the liquid state.

The chillers and settlers are then slowly vented through lines 18, 19, 20, down to approximately atmospheric pressure, with the propane vapor passing off through line 21 to the suction side of the compressor 22, which is connected with condenser 23, to liquefy and return the propane to storage through line 24.

During this cooling operation, relatively warm propane at a temperature which may range from 60° to 120° F. is introduced from storage tank 3, through lines 25, 26, 27. These lines are shown as entered down into the bottom of the chilling and settling tanks, so as to make this warm propane bubble up through the previously introduced petrolatum solution. This accomplishes an agitation and thorough admixture and to maintain the liquid level up to or close to the top try-cock, this admission of warm propane is continued during the chilling operation and until the temperature in the chillers and settlers is brought down to approximately 30° F. After this temperature has been reached, the desired high level is maintained by adding cold propane at a temperature of approximately —45° F., corresponding to atmospheric pressure, from cold propane storage tank 28 by pump 29 through lines 30—25, 26, 27.

The cold propane storage tank 28 in the illustration, is charged by expanding warm propane into it through line **30*a*, from propane storage 3, under control of expansion valve 31. Propane vapor resulting from this refrigerating operation is taken off through lines 32—21 and compressed and condensed in the compression system heretofore described and represented at 22, 23**.

The solution ratios may vary but the following may be considered as a desirable example: With chillers and settlers of a total full capacity of 2000 gallons each, the liquid contained in each tank to the top try-cock may be 1800 gallons. The mixture of propane and petrolatum charged into the tank to this top try-cock level would then consist of 1325 gallons of propane and 475 gallons of petrolatum or a ratio of approximately 2.78 to 1. After the first chilling by evaporation and the addition of warm and then cold propane to further chill and bring the mixture up to the top level, this ratio of propane to petrolatum remains the same, but the temperature of the charge has been reduced to approximately —45° F., which corresponds to atmospheric pressure.

The chillers are then shut in and filled to full capacity, in the example, 2000 gallons, with cold propane from tank 28 through pump 29 and lines 30—25, 26, 27. This pump may be continued in operation until pressure on the chillers reaches approximately 60 lbs., whereupon these chilling and settling tanks may be shut in under such pressure (60 lbs.), with a temperature of —45° F.

In this closed in state, the amount of propane has been increased to 1525 gallons, while the amount of petrolatum remains the same, 475 gallons, resulting in an increased ratio of propane to petrolatum mixture of about 3.21 to 1. The stirring or agitation of the mixture by entry of the warm and the cold propane and the boiling due to evaporation results or creates a practically perfectly uniform mixture of oil in propane and solid wax ready to settle.

A settling period of from 1 to 2 hours is usually sufficient for the wax content of the solution to drop to the bottom of the tank, the bright stock remaining in solution in the propane as a definite layer above the wax layer.

The precipitation of the wax results in a much lower propane to wax ratio in the bottom, wax layer. In the example under consideration, this may be a 1 to 1 ratio involving 225 gallons of propane and 225 gallons of wax, leaving an upper clear liquid layer containing 1225 gallons of propane and 250 gallons of bright stock, a propane to oil ratio of about 5 to 1. At or about such ratios, the wax recovered from the lower layer will have a melting point of between 125° F. and 145° F. and the bright stock from the upper layer will show a pour test of from 0° F. to 15° F. At higher ratios of propane to petrolatum the wax will show a slightly higher melting point and the bright stock produced will have a higher cold test. The latter apparently is due to the increased solubility of wax in the oil layer, because of the solubility of wax in propane, even at the low temperatures existing in the chillers and settlers.

The chilling of the tanks by venting to the compressor through lines 18, 19, 20, 21, is preferably gradual, being carried out in the example over a period of not less than two hours. This is because shorter chilling time results in slower and less complete and definite settling of the wax layer.

The try-cocks 17 afford a ready means for determining the level of the wax layer and with this ascertained, the oil layer may be withdrawn down to the wax layer level through level control cocks 33 and lines 34, 35, 36 and pump 37 to the oil stabilizer 38.

The reduction of the propane to wax ratio in the lower layer of approximately 1 to 1, makes this mixture somewhat difficult to handle, it being so thick and pasty that it can not ordinarily be pumped. Therefore, after drawing off the clear oil solution, the waxy mixture may be heated as by coils 39, in the bottoms of the tanks through which hot oil or the like may be circulated from tank 40, Fig. 2, through heater 41 and return line 42, by circulating pump 43. This generates pressure in the chillers by vaporization of remaining propane therein and this hot oil circulation may be maintained until the pressure generated exceeds that at which the wax stabilizer is operated. This stabilizer is indicated at 44, Fig. 1 and its normal operating pressure may be 150 lbs. To overcome this, the chillers and settlers would be heated in the illustration to generate a pressure of approximately 225 lbs. at which pressure the entire wax layers with accompanying propane will discharge through lines 25, 26, 27—45 into the wax stabilizer.

The oil stabilizer 38 and wax stabilizer 44, are shown as connected at the top by a vapor line 46, running to the discharge side of the compressor 22 and into condenser 23 and whereby the propane vapor is condensed and returned to the storage tank 3.

The heat required for stripping the propane from the oil and the wax is supplied in the illustration by steam coils 47, 48, in the bottoms of the stabilizers and the oil and wax from these two stabilizers are shown as discharged through lines 49, 50, into the oil and wax strippers 51, 52, having top propane vapor connections 53, 21, to the suction side of the compressor and oil and wax delivery bottom connections 54, 55.

The oil and wax strippers 51, 52, are shown heated by steam coils 56, 57 and serve to remove the last traces of propane from the oil and wax taken from the bottoms of the oil and wax stabilizers. These strippers are operated at the pressure existing in the suction line of the compressor, which may be 0 to 15 pounds gauge pressure.

The oil and the wax freed of solvent are indicated in the illustration as passed through lines 54, 55, from the strippers 51, 52 to storage by way of pumps 58, 59, and the oil and the wax coolers 60, 61.

Complete settling of wax and separation of wax and oil can be effected in the relatively short period of from 1 to 2 hours, after chilling. During the chilling, the mixture ratios are controlled by additions of warm and cold propane to restore the original ratio and finally to increase it before settling. By carrying out the settling under pressure of approximately 60 lbs. per square inch, the distinction between the wax and oil layers is definite and complete enabling production of high melting point wax and practically wax free oil from petrolatum containing as much as 75% wax. Both wax and bright stock having been previously subjected to decolorizing, are free of objectionable color and the oil is usually of better color than the bright stock from which the petrolatum was originally obtained. The bright stock produced from the petrolatum is that portion of the bright stock content of crude most closely related to the wax content of the crude and consequently has a higher viscosity index than the usual bright stock obtained from any given crude. It also has a more desirable viscosity-flash relationship.

From petrolatum originating from Pennsylvania crude, bright stock can be obtained under this process having a pour test of 0° F. to 5° F. with a viscosity index of 100 to 105. With a pour test of 20° F. to 25° F., the viscosity index is raised to approximately 105 to 115. This bright stock has as good or better color than the bright stock produced from the solution where the petrolatum originated and has a higher oiliness factor, the latter apparently because of its being the closest related to the paraffin content of the crude. The more desirable viscosity flash relationship is shown by the fact that bright stock produced as above has a Saybolt viscosity of 142 seconds at 210° F. with a flash point of 540° F., while the bright stock from which the petrolatum originated has a viscosity of 150 seconds at 210° and the same flash point of 540° F.

While the process involves batch operation, the system may be developed into alternate use of the chilling and settling chambers, so as to gain continuous or semi-continuous operation. This is feasible particularly because of the relatively short chilling and settling periods required. The relatively high proportion of wax in the petrolatum stock and the approximately 1 to 1 wax-propane settling ratio provides a relatively high yield of wax to the stock processed. This wax, coming from petrolatum, a previously decolorized stock, is of good quality, high melting point and amorphous in character and therefore particularly suited to special purposes for which the ordinary lower melting point so-called crystalline wax is not adapted.

Aside from the special chilling and settling chambers, the apparatus may be built up of more or less standard units, no complicated or otherwise unusual equipment being required and with proper understanding of the action, the process may be practiced without special training.

The application of the pressure for cold settling by pumping the chillers full is advantagous, but as an alternative, pressure may be applied in other ways and without necessarily pumping the tanks full. By way of example, a line 62, is shown extending from the top of the propane storage tank 3, branched at 63, to the several chilling tanks and suitably valved at 64, enabling application of pressure from the propane storage tank, for settling, with the chilling and settling chambers less than completely full and possibly at different selected levels.

Instead of chilling the mixture by evaporation of a portion of the solvent as above described, the refrigeration may be accomplished by indirect means. In this mode of operation the tanks may be completely filled with the propane petrolatum solution and then chilled by utilizing the coils in the bottoms of the tanks as chilling surfaces. In Fig. 2, there is indicated at 66, a suitable cooler connected by piping 67, with the circulating coils 39, valves 68 being provided in the heater lines and valves 69, in the cooler lines, enabling alternative use of the circulating coils. If desired, an entirely independent set of piping may be employed for chilling purposes and the cooler may be of the brine circulating, ammonia expansion or other suitable type of apparatus.

If indirect chilling is employed, the petrolatum to propane ratios, after chilling to —45° F., would preferably be approximately the same as those in the above given example and the settling would result in the same ratios in the oil and wax layers. The thermosyphonic flow established by operation of chilling coils in the bottoms of the tanks, accomplishes a desirable mixing or agitation similar in general effect to that accomplished by bubbling the solvent up through the mixture in the first described mode of operation.

While propane serves as a particularly satisfactory solvent and diluent, it will be appreciated that other solvents of like character may be employed and that the use of this and other terms in the description of the example above is not by way of limitation, except as that intent is clearly indicated.

What is claimed is:

1. The herein disclosed process of producing a high melting point wax, which comprises dissolving petrolatum stock in a solvent, chilling the solution and cold settling under pressure in a closed vessel to precipitate the waxy content, withdrawing the oily content from the vessel, heating the precipitated wax solvent layer to melt the wax and generate pressure by vaporization of the solvent to force said waxy layer from the closed vessel and separately stabilizing and stripping the withdrawn oily and waxy materials.

2. The herein disclosed process of producing a high melting point wax which comprises dissolving petrolatum stock in a normally gaseous liquefied hydrocarbon solvent, chilling and cold settling under pressure in a closed vessel to precipitate the wax content, withdrawing the oily content from the wax layer in the bottom of the vessel, heating the wax-solvent layer in the closed vessel to melt the wax and generate sufficient pressure by vaporization of the solvent to force the melted wax and the remaining solvent from the vessel, distilling said wax-solvent mixture under pressure and regulating the pressure generated in the closed vessel to overcome the pressure of distillation to cause discharge of the wax-solvent layer from the closed vessel to said distillation unit.

3. The process as in claim 2 in which the chilling is effected by reducing the pressure in the closed vessel sufficiently to evaporate enough of the normally gaseous liquefied hydrocarbon solvent to chill the solution to the settling temperature, and in which the pressure in the closed settling vessel is maintained in excess of the vapor pressure of the chilled solution during the settling operation.

4. The process as in claim 2 in which chilling is effected by vaporization of a portion of the normally gaseous liquefied hydrocarbon solvent and in which additional liquid solvent is added during the chilling stage to restore the solvent ratio to approximately the original solvent ratio.

5. The process as in claim 2 in which the original ratio of solvent to petrolatum is in the order of 2.78 to 1 and in which this ratio is increased to approximately 3.21 to 1 for the settling stage.

CLAUDE F. TEARS.